Aug. 19, 1930.   R. S. SCOTT   1,773,281
AIRCRAFT
Filed May 6, 1929
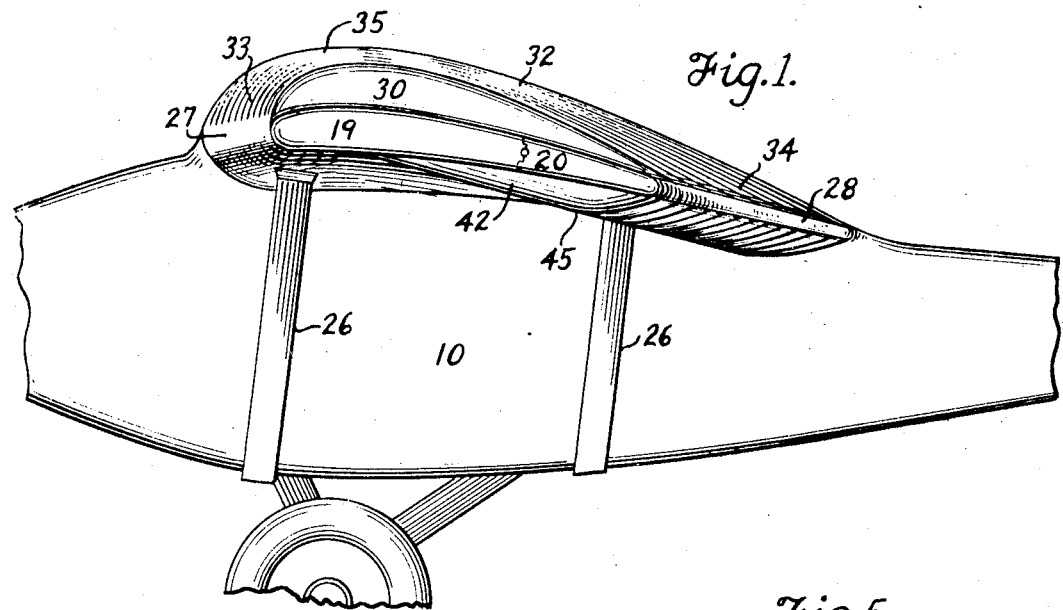
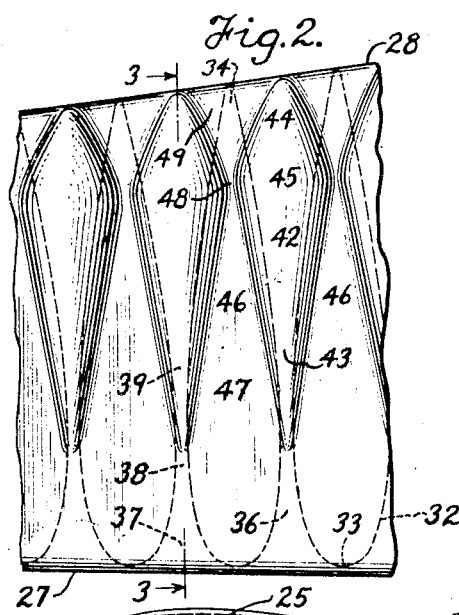
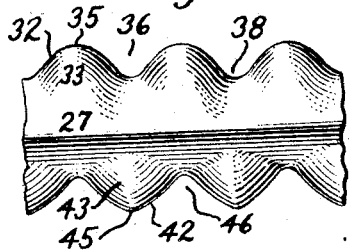
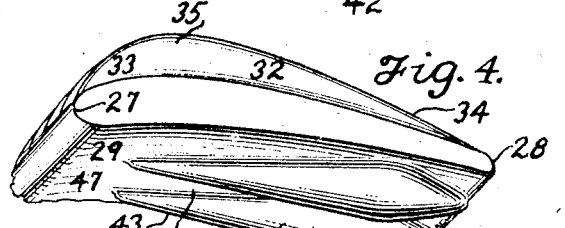
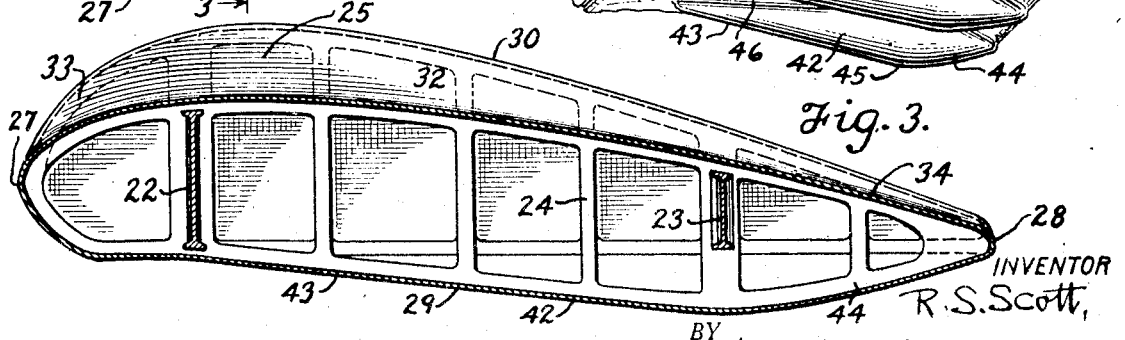
INVENTOR
R. S. Scott,
BY Morrison, Kennedy & Campbell, ATTORNEYS.

Patented Aug. 19, 1930

1,773,281

UNITED STATES PATENT OFFICE

ROSSITER S. SCOTT, OF NEW YORK, N. Y.

AIRCRAFT

Application filed May 6, 1929. Serial No. 360,738.

This invention relates to aircraft; and the features of novelty pertain more particularly to an aerofoil or surface designed to be projected through the air in order to produce a useful dynamic reaction. The invention therefore is not restricted in utility to the lifting surfaces or wings, or other sustaining members of aeroplanes, or other heavier-than-air flying machines, but may be employed with aerofoils used in any type of aircraft, for example used for supplementary lifting purposes in lighter-than-air craft, or even in the construction of revoluble elements, propellers, lifters and the like.

A general object of the present invention is to improve the efficiency of aerofoils or aircraft of various types, for example of the type illustrated in my pending application, Serial No. 305,359, filed September 12, 1928, to which the present invention is shown applied for purposes of illustration. A further object is to improve the lift of aerofoils or aircraft, more especially by increasing the pressure lift, or sustaining effect produced by positive pressure at the underside of the aerofoil, along with improvement in the suction lift. A further object is to increase the relative velocity of the air flow at and from the trailing edge of the aerofoil, thus eliminating the disadvantageous effects of eddies otherwise apt to be produced both above and beneath the trailing edge. A further object is to improve structural strength of an aerofoil.

Further objects and advantages of the present invention will be set forth in the hereinafter following description of an illustrative embodiment thereof, or will be understood to those skilled in the subject. To the attainment of such objects and advantages the present invention consists in the novel aircraft, aeroplane or aerofoil herein illustrated or described, and the novel features of operation, arrangement, construction and design thereof.

In the accompanying drawings Fig. 1 is a partial side elevation of an aircraft or airplane, in flying position, embodying the present invention, many matters and details being omitted which are illustrated in my prior application or are unnecessary to an understanding of the principles of the present invention.

Fig. 2 is a bottom plan view of a portion of the aerofoil or wing comprised in the aircraft of Fig. 1.

Fig. 3 is a fore-and-aft vertical section taken substantially on the line 3—3 of Fig. 2.

Fig. 4 is a detached perspective view showing a representative portion of the aerofoil of Figs. 1 to 3.

Fig 5 is a front elevation of a portion of the aerofoil

Fig. 6 is a view similar to Fig. 4 but showing a modified form of aerofoil or wing.

The same reference numbers refer to corresponding parts in the several figures of the drawings.

An aircraft embodying this invention may have any form of body, such as the aeroplane fuselage 10, of the usual streamline form. For illustrative purposes a monoplane has been selected, the wing 19 of which constitutes an aerofoil embodying the invention. It is to be understood that the invention is applicable to any type of aerofoil or wing or any arrangement of aerofoils or wings. In the accompanying drawings each half wing or side of the aerofoil 19 is shown as provided with the usual hinged aileron 20 for controlling the lateral movement or roll of the craft.

The wing or aerofoil may be cambered both above and below, and is built up and braced by any suitable structure; for example, the wing is herein shown as comprising transverse spars 22 and 23, the main spar 22 being preferably a metal I-beam of substantially the full depth of the wing while the rear spar 23 is of shorter depth and smaller dimension. Either spar, for example the rear one, instead of an I-beam may be a cantilever truss, containing verticals and diagonals, affording greater depth and utilizing the spaces within the wing ridges, both above and beneath.

By these spars 22 and 23 and a system of fore-and-aft frames or cambered ribs a skeleton bracing system of the cantilever type is built up. The longitudinal ribs are of two shapes, which may be distinguished as low ribs 24 and high ribs 25, each preferably stamped out of light metal and of open structure adapted for attachment to the spars. Exterior of the wing are indicated the usual diagonal braces 26 extending from the wing to the fuselage.

At the under side of the wing and extending from the leading edge 27 to the trailing edge 28 is shown an under covering or skin 29 which may be constructed of thin metal or other suitable sheeting. This under covering may be slightly cambered upwardly and with its fore-and-aft edges rounded to the wing edges respectively. The covering 29 is shaped to the alternate high and low ribs or frames and thus is formed into a series of longitudinal or fore-and-aft ridges as will be more fully described.

The upper covering or sheeting 30 is shown as struck or otherwise formed as indicated in said prior application, although for the purposes of the present improvement it might in some cases have different forms. The illustrated form may be described as embodying a plurality of streamline ridges or fore-and-aft elevations 32 upstanding upon the wing, each having a rounded nose 33 and a tapered tail 34 extending substantially to the trailing edge of the wing, with a peak 35 not far from the plane of the forward spar 22. These ridges are preferably spaced fairly close so as to produce between them a series of valleys or fore-and-aft depressions 36, the approach or entrance 37 of each of which is tapered toward its throat or channel 38 and thence flares rearwardly as at 39.

Each of the ridges 32 is of streamline shape and in the nature of a protuberance projecting at the top or suction side of the aerofoil or wing. Each tapered-flared valley between two ridges is in the nature of an air nozzle, or rather half nozzle, of the venturi type, tending therefore to deliver rearwardly from the throat a stream of air of accentuated velocity, giving the operation and advantages described in the prior application.

Referring further to the fore-and-aft ridges 42 at the under or pressure side of the aerofoil edge of these may be generally similar to the upper ridges 32, but inverted, modified, and performing different functions. This is believed to be the first instance of an aerofoil or wing having at its under or pressure side a series of longitudinal or fore-and-aft ridges of flared-tapered or streamline form, irrespective of the upper side formation.

Preferably the underneath ridges 42 are not of the full fore-and-aft dimension of the wing, and each of them is shown as commencing at a point substantially aft of the leading edge but continuing substantially to the trailing edge of the wind. Each of the ridges 42 is formed with a front end 43 which gradually flares and widens to the point of maximum width, fairly near to the trailing edge, the form thence tapering or decreasing to a rounded tail 44, with a peak or high point 45 between the nose and tail.

This system of underneath ridges is so arranged as to form between them a series of air channels or valleys 46, each having a tapered approach 47 to the throat or narrow point 48 and a flared getaway or discharge 49. By this arrangement a system of half nozzles is afforded tending to give accentuated speed to air passing along the valleys.

In my preferred construction the aerofoil or wing is provided with the first or upper series of ridges, at the suction side, in combination with the underneath system of ridges at the pressure side of the aerofoil, the two cooperating, especially in the mode of delivery of air from the trailing edge of the wing. Moreover, as clearly indicated in Figs. 2 and 5, the ridges of each series, top or bottom, are opposite to the spaces or valleys between the ridges of the other series. This results not only in a more effective control of the air flow, but in a structure of greater strength. Whereas in the prior application the alternate fore-and-aft frames or ribs are respectively of great and small depth, in the present construction all of the ribs may be of substantially the full depth. Thus the ribs 24, while they extend upwardly only to the valleys of the upper side of the wing, extend downwardly to the full depth of the inverted ridges at the underside of the wing. This advantageous full depth of structural rib applies also to the alternate ribs 25 which extend upwardly through the ridges at the top side and downwardly to the valleys at the underside of the wing.

The operation of the described aircraft may be further explained as follows. In the prior application it was shown that the upstanding fore-and-aft ridges of the aerofoil substantially improved the directional stability of the air-craft. The system of ridges has the effect of a number of inverted keels, tending to maintain and to restore direction of flight. With the present improvement the directional stability is still further increased since the keel effect is afforded not only at the upper but at the underneath side of the aerofoil. For similar reasons the tendency to sideslip and yaw is minimized by the keel effect both of the top side ridges and the underneath ridges.

The improved lifting power of the aircraft may be explained as follows. The top side formation, as shown also in the prior application, substantially increases the suction effect and lift. This is due to the fact that the streamline ridges, having their noses near the leading edge of the aerofoil, deliver a more forcible upward deflection and spreading of the airstream encountered at the leading edge. It is this upward deflection of the airstream that creates the relative suction or minus pressure along the top side of the wing, and with the described construction the airstream is carried more forcibly away from the aerofoil and is thus prevented from sweeping down upon the aft portion of the wing and creating a pressure to cancel the desired suction and lift to a substantial extent. When properly constructed the impinging airstream may be so deflected that it will be unable to flow downwardly into further contact with the wing, but will be carried off inoperatively to the rear. The lifting effect of the top side is also enhanced by the progressively decreasing or shrinking cross section of the several ridges beyond the peaks thereof. The rapidly decreasing cross section tends naturally to leave voids and increase suction. These advantages of form and operation apply to the present structure.

With the present invention the lift is further improved through control of the pressure at the under side of the aerofoil. This refers more especially to the after portion of the under surface, the result being obtained by the present of the described ridges and valleys. It is well known that with an ordinary aerofoil the lifting pressure, while quite strong and effective near the leading edge, is substantially inoperative toward the trailing edge. With the present invention it is intended to utilize substantially the entire under side of the areofoil for pressure sustaining purposes. This is due to the presence of the preferably flared-tapered or streamline ridges 42 projecting downwardly below the normal surface of the wing. By this arrangement the surface is permitted to extend downwardly to an extent where it is able to cooperate with the relatively moving air so as to afford a sustaining pressure. The substantial depth, and the expanding or increasing cross section of the several underneath ridges cooperate in the tendency to maintain a sustained lifting pressure nearly to the trailing edge. It is believed that by this construction any form of aerofoil can be substantially improved in its lifting and sustaining qualities.

At the trailing edge of the aerofoil or wing it is desirable to prevent eddies which may sweep back and impair the lift either by creating a pressure at the upper side or a suction at the under side. The prior application explains how such eddies are reduced through the control of the airstream passing over trailing edge. With the present invention the effect is very materially improved by reason of the action upon the air of the underneath streamline ridges and the tapered-flared valleys between them. Each of these valleys constitutes to an extent a nozzle tending to discharge the air with a rearward velocity in excess of the normal. For each of the valleys there will be a relative rearward airstream of substantial force delivered below the trailing edge of the wing. This realtive velocity of air in a rearward direction tends to carry the air flow away from the wing and prevent the objectionable eddying back of the air. As herein shown the air flow from the trailing edge is controlled both at the upper and under sides, the several relative airstreams cooperating to sweep the wing clear of any tendency to eddying.

There has thus been described an aircraft embodying an aerofoil in accordance with and attaining the objects of the present invention. Since many matters of operation, arrangement, construction and design may be variously modified without departing from the principles involved, it is not intended to limit the invention to such matters except so far as set forth in the appended claims.

What is claimed is:

1. In or for an aircraft an aerofoil having at its suction surface a series of longitudinal streamline ridges and at its pressure surface a series of longitudinal ridges, the ridges of one series being opposite to the spaces between the ridges of the other series.

2. An aerofoil formed at its suction side with a system of longitudinally tapered-flared air channels and at its pressure side with a system of longitudinally flared-tapered ridges opposite to said channels.

3. An aeroplane wing having a cantilever bracing comprising transverse spars and a system of alternate high and low longitudinal ribs, with top and bottom covering shaped to such ribs to form a system of longitudinal ridges and valleys at each surface of the wing.

4. In or for an aircraft a sustaining aerofoil or wing having at its upper surface a closely spaced parallel system of fore-and-aft ridges of substantial width and depth and convexly curved both widthwise and depthwise, with rounding front ends near the leading edge of the aerofoil and rear ends tapered substantially to the trailing edge, and forming between them air channels of tapered-flared form, and having at its under surface a closely spaced parallel system of fore-and-aft ridges convexly curved both widthwise and depthwise forming a system of longitudinally tapered-flared air channels extending substantially to the trailing edge.

5. An aerofoil or wing as in claim 4 and wherein the under surface ridges have their front ends spaced substantially away from the leading edge of the wing, thence flaring rearward gradually to their points of maximum section, thence tapering rearward abruptly to the trailing edge of the wing, and the axes of such ridges being beneath the several air channels formed between the upper surface ridges.

6. In or for an aircraft a sustaining aerofoil or wing having at its under or pressure side a system of parallel fore-and-aft ridges of substantial width and depth and convexly curved both widthwise and depthwise and shaped to form between them a series of valleys or air channels of longitudinally tapered-flared form affording a velocity nozzle of the Venturi type with its throat nearer to the trailing than the leading edge of the aerofoil and its getaway extending substantially to the trailing edge.

7. In or for an aircraft a sustaining aerofoil or wing having at its under or pressure side a parallel system of fore-and-aft ridges of substantial width and depth and of streamline form both widthwise and depthwise and shaped to form between them a series of valleys or air channels of longitudinally tapered-flared form commencing substantially aft of the leading edge of the aerofoil and affording a velocity nozzle of the Venturi type with its throat nearer to the trailing than the leading edge of the aerofoil and its getaway extending substantially to the trailing edge.

8. In or for an aircraft a sustaining aerofoil or wing having at its under side a system of parallel fore-and-aft ridges convexly curved both widthwise and depthwise and shaped to form between them a series of valleys or air channels of longitudinally tapered-flared form extending substantially to the trailing edge of the aerofoil, with the peaks of the ridges and throats of the channels substantially nearer to the trailing than to the leading edge.

9. In or for an aircraft a sustaining wing formed at its under side with a system of fore-and-aft ridges shaped to produce between them converging-diverging air channels of Venturi form with their throats nearer to the trailing than the leading edge of the wing and delivering with high velocity past the trailing edge.

In testimony whereof, this specification has been duly signed by:

ROSSITER S. SCOTT.